(12) United States Patent
Barnum et al.

(10) Patent No.: US 11,005,712 B2
(45) Date of Patent: *May 11, 2021

(54) TECHNIQUES FOR DYNAMIC NETWORK STRENGTHENING

(71) Applicant: Capital One Services, LLC, McLean, VA (US)

(72) Inventors: Eric K. Barnum, Midlothian, VA (US); Bryan Pinos, Williamsburg, VA (US); Lindsay Helbing, Newport News, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/983,582

(22) Filed: Aug. 3, 2020

(65) Prior Publication Data

US 2020/0382370 A1 Dec. 3, 2020

Related U.S. Application Data

(63) Continuation of application No. 16/425,447, filed on May 29, 2019, now Pat. No. 10,756,971.

(51) Int. Cl.
*H04L 12/24* (2006.01)

(52) U.S. Cl.
CPC ........ *H04L 41/0816* (2013.01); *H04L 41/046* (2013.01); *H04L 41/0836* (2013.01); *H04L 41/0873* (2013.01); *H04L 41/0886* (2013.01)

(58) Field of Classification Search
CPC .................................................. H04L 51/0816
USPC ......................................................... 370/328
See application file for complete search history.

(56) References Cited

U.S. PATENT DOCUMENTS

| 10,644,954 | B1 | 5/2020 | Pinos et al. |
| 10,713,108 | B2 | 7/2020 | Thomas et al. |
| 10,756,971 | B1 * | 8/2020 | Barnum .............. H04L 41/0873 |
| 2016/0117646 | A1 | 4/2016 | Lerick et al. |
| 2017/0168797 | A1 | 6/2017 | Pogrebinsky |
| 2017/0281676 | A1 | 10/2017 | Adhami |

* cited by examiner

*Primary Examiner* — Peter G Solinsky
(74) *Attorney, Agent, or Firm* — Kacvinsky Daisak Bluni PLLC

(57) ABSTRACT

Various embodiments are generally directed to techniques for network strengthening, such as by detecting issues with one or more network components and reconfiguring one or more upstream or downstream network components to preempt issues with the one or more upstream or downstream network components, for instance. Some embodiments are particularly directed to a tool (e.g., strengthening agent) that implements pre-scripted or dynamic hardening of up and downstream dependencies of a network component in response to an issue identified with the network component. In many embodiments, up and downstream components of a network component may be reconfigured while the issue with the network component is being addressed to preempt issues with the up and downstream components.

20 Claims, 6 Drawing Sheets

100

200

*300*

500

600

TECHNIQUES FOR DYNAMIC NETWORK STRENGTHENING

RELATED APPLICATIONS

This application is a continuation of U.S. patent application Ser. No. 16/425,447, filed May 29, 2019, titled "TECHNIQUES FOR DYNAMIC NETWORK STRENGTHENING". The contents of the aforementioned application are incorporated herein by reference in their entirety.

BACKGROUND

Generally, a computer network is a digital telecommunications network which allows nodes, or components, to share resources. In computer networks, computing devices exchange data with each other using connections between nodes via various transmission media, such as via wired or wireless mediums. Computer networks can support a large number of applications and services such as access to the World Wide Web, digital video, digital audio, and shared use of application and storage servers. The amount of data moving across a computer network may be referred to as traffic. Typically, network data in computer networks is encapsulated in network packets, which provide the traffic load in the network. Generally, traffic management may include one or more of network traffic control, network traffic measurement, network traffic simulation, network traffic modeling, and network configuration.

DETAILED DESCRIPTION

Figure 1:
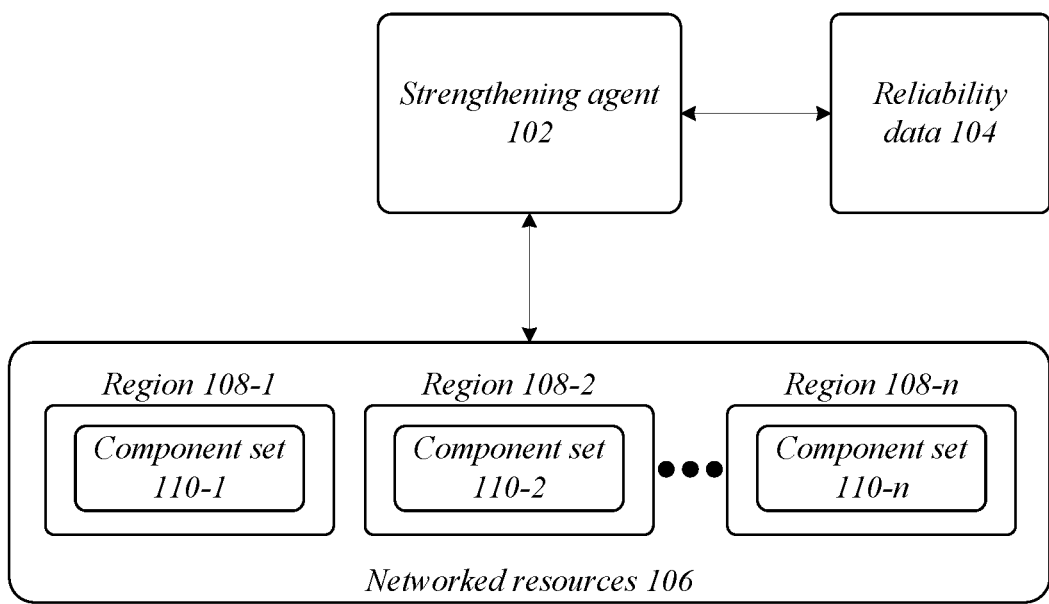
FIG. 1 illustrates an embodiment of a first operating environment according to one or more embodiments described herein.

Various embodiments are generally directed to techniques for network strengthening, such as by detecting issues with one or more network components and reconfiguring one or more upstream or downstream network components to preempt issues with the one or more upstream or downstream network components, for instance. Some embodiments are particularly directed to a tool (e.g., strengthening agent) that implements pre-scripted or dynamic hardening of up and downstream dependencies of a network component in response to an issue identified with the network component. In many embodiments, up and downstream components of a network component may be reconfigured while the issue with the network component is being addressed to preempt issues with the up and downstream components. These and other embodiments are described and claimed.

Some challenges facing network management include network component failure adversely affecting the operation of other upstream or downstream network components. For example, failure of a network component may place additional load on other network components, overloading and causing errors with the other network components. These challenges may result from complex interdependencies between various network components. For instance, a network node may provide and/or utilize a functionality to other up and downstream network nodes (e.g., via an application program interface (API)). In such instances, if the network node fails, other network nodes with up and downstream dependencies may fail. Adding further complexity, reconfiguring upstream and downstream components in response to an issue with a network component is typically a time-consuming and primarily manual process. These and other factors may result in network management with limited scalability, deficient performance, poor adaptability, and insufficient ability to maintain optimal and efficient network operation in response to issues with network components. Such limitations can drastically reduce the capabilities, usability, and applicability of components in the network, contributing to inefficient systems with limited capabilities and excessive downtime.

Various embodiments described herein include a strengthening agent that can automatically reconfigure one or more network components and/or traffic routing associated therewith, in response to an issue with another network component. In many embodiments, reconfiguration of the one or more network components can prevent problems with the one or more network components that are caused by issues with the other network component. In some embodiments, the strengthening agent may allocate additional resources to a first network component based on issues with a second network component. For example, failure of the second network component may increase the load on the first network component (e.g., by receiving additional traffic normally handled by the second network component), leading to a reduction in quality of service (QoS). Accordingly, in such examples, the strengthening agent may automatically allocate additional resources to the first network component in response to the failure of the second network component to prevent the reduction in QoS.

In some embodiments, the strengthening agent may identify and map impact chains (e.g., interdependency chains) and/or optimal paths for one or more portions of a network. In some such embodiments, an impact chain main includes one or more upstream and/or downstream components of a network component that may be affected by issues with the network component. In various embodiments, the strengthening agent may include specific scenarios for components and responses to the specific scenarios. For instance, the specific scenario may include a failover from a first region to a second region and the response may include augmented changes to a set of network components potentially impacted by the failover. In one or more embodiments, the strengthening agent may generate one or more graphical representations of network configurations and/or impact chains. In one or more such embodiments, the graphical representations may be present via a user interface. In various embodiments, the graphical representations may facilitate quicker and better responses to network component failures to be designed and/or implemented.

In these and other ways, the strengthening agent may increase efficiency, improve performance, and/or reduce downtime of networks, or components thereof, in an accurate, robust, efficient, dynamic, and scalable manner, resulting in several technical effects and advantages over conventional computer technology, including increased capabilities and improved adaptability. In various embodiments, the strengthening agent may be implemented in a practical application via one or more computing devices, and thereby provide additional and useful functionality to the one or more computing devices, resulting in more capable, better functioning, and improved computing devices. In many embodiments, the strengthening agent may make interdependencies and configurations of network components more robust and accessible by providing familiar, user-friendly interface objects, such as to visualize and/or interact with impact chains associated with network components.

In several embodiments, the strengthening agent may provide specific and particular manners of automatically monitoring and controlling network configurations and allocations, such as to maintain proper operation of upstream or downstream components. In one or more embodiments, the strengthening agent may be implemented as a set of rules that improve computer-related technology by allowing a function not previously performable by a computer that enables an improved technological result to be achieved. In one or more such embodiments, the function may include automatically identifying and correcting network configurations and/or allocations associated with a network component based on issues with another network component as an improved technological result. In some embodiments, the strengthening agent may enable a computing device to improve robustness and increase the performance of networks, or components thereof, such as by preemptively strengthening network components against potential issues based on the identification of and/or correlation with issues of other network components.

Various embodiments described herein may include an apparatus comprising a processor and a memory comprising instructions that, when executed by the processor, cause the processor to perform operations comprising one or more of: analyze an event log and a response log that correspond to a component in a set of components implemented by a set of networked resources, the event log comprising one or more events associated with one or more operational issues identified for the component and the response log comprising one or more actions taken to remedy each of the one or more events in the event log, wherein a corresponding one or more actions in the response log taken to remedy a particular event of the one or more events in the event log include actions taken on one or more associated components in the set of components implemented by the set of networked resources, with at least one upstream or downstream dependency to the component, that were affected by the particular event; determine a set of corrective actions to implement, in response to occurrence of the particular event to the component, on the one or more associated components, with at least one upstream or downstream dependency to the component, that were affected by the particular event based on analysis of the event log and the response log that correspond to the component in the set of components; identify an occurrence of the particular event of the one or more events comprised in the event log and associated with one or more operational issues identified for the component; and implement the set of corrective actions on one or more associated components, with at least one upstream or downstream dependency to the component, that were affected by the particular event in response to the occurrence of the particular event to prevent affects to the one or more associated components caused by the occurrence of the particular event.

One or more embodiments described herein may include at least one non-transitory computer-readable medium comprising a set of instructions that, in response to being executed by a processor circuit, cause the processor circuit to perform one or more of: analyze an event log and a response log that correspond to an application program interface (API) in a set of components implemented by a set of networked resources, the event log comprising one or more events associated with one or more operational issues identified for the API and the response log comprising one or more actions taken to remedy each of the one or more events in the event log, wherein a corresponding one or more actions in the response log taken to remedy a particular event in the event log include actions taken on one or more associated components in the set of components implemented by the set of networked resources that were affected by the particular event; determine a set of corrective actions to implement, in response to occurrence of the particular event to the API, on the one or more associated components that were affected by the particular event based on analysis of the event log and the response log that correspond to the API in the set of components; identify an occurrence of the particular event of the one or more events comprised in the event log and associated with one or more operational issues identified for the API; and implement the set of corrective actions on one or more associated components that were affected by the particular event in response to the occurrence of the particular event to prevent affects to the one or more associated components caused by the occurrence of the particular event.

Some embodiments described herein may include a computer-implemented method comprising one or more of: analyzing an event log and a response log that correspond to an application program interface (API) in a set of APIs implemented by a set of networked resources, the event log comprising one or more events associated with one or more operational issues identified for the API and the response log comprising actions taken on one or more associated APIs in the set of APIs that were affected by at least one of the one or more events associated with operational issues identified for the API; determining at least one corrective action to resolve an event of the one or more events comprised in the event log based on analysis of the event log and the response log, wherein the at least one corrective action to resolve the event corresponding to the one or more associated APIs of the set of APIs implemented by the set of networked resources affected by the event; identifying an occurrence of the event of the one or more events comprised in the event log and associated with one or more operational issues identified for the API; and implementing the at least one corrective action on at least one API of the one or more associated APIs of the set of APIs implemented by the set of networked resources affected by the event to resolve the event of the one or more events comprised in the event log and associated with one or more operational issues identified for the API.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to the desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given. For instance, in some embodiments, a machine may include a virtual machine implemented on a computing platform.

Reference is now made to the drawings, wherein like reference numerals are used to refer to like elements. In the following description, for purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

FIG. 1 illustrates an embodiment of an operating environment 100 according to one or more embodiments described herein. Operating environment 100 may include strengthening agent 102, reliability data 104, and networked resources 106. In the illustrated embodiment, networked resources 106 may include one or more regions 108-1, 108-2, 108-n and each of the one or more regions may include a component set 110-1, 110-2, 110-n of one or more network components. In one or more embodiments described herein, strengthening agent 102 may operate to recognize and correct symptoms or issues with components in, or implemented by, networked resources 106. For instance, strengthening agent 102 may monitor traffic and/or logs to identify an issue with a component and implement corrective actions to prevent issues with one or more downstream or upstream component based on the identified issue. In many embodiments, strengthening agent 102 may build and/or utilize reliability data 104, such as to select corrective actions. In various embodiments, strengthening agent 102 may utilize reliability data 104 to identify correlations between issues of different network components. In various such embodiments, corrective actions may be determined based at least in part on the correlations. Embodiments are not limited in this context.

In one or more embodiments, corrective actions implemented to prevent issues with one or more components that are downstream or upstream to a specific component of based on the identification of an issue with the specific component. In one or more such embodiments, these corrective actions may be referred to as preemptive actions. In many embodiments, preemptive actions may include one or more of autoscaling, instance creation/destruction, dark instances, traffic routing, and the like In various embodiments, strengthening agent 102 may identify issues with a component, such as misconfigurations or excessive traffic flow, and automatically determine one or more preemptive actions to take with respect to one or more downstream or upstream components as needed to optimize network performance, correct issues, and maintain quality of service (QoS). For example, the strengthening agent 102 may allocate additional resources in networked resources 106 to a first API in response to the failure of a second API that performs the same or similar function as the first API. In another example, the strengthening agent 102 may trigger autoscaling additional instances of a first API in response to the failure of a second API that performs the same or similar function as the first API.

In several embodiments, strengthening agent 102 may detect up or down spikes in traffic and/or logged errors specific to a network component and dynamically implement either regional activation or failover of an API based on pre-configuration of the API to work in other regions, as well as, trigger appropriate instances and autoscaling to support the failover. In one or more embodiments described herein, an issue with a network component may include one or more operating conditions or settings that cause or have the potential to cause limited or unintended functionality associated with networked resources 106. In one or more such embodiments, the issues may include a symptom identified by the strengthening agent 102. In some embodiments, the strengthening agent 102 may allocate additional networked resources to maintain QoS and prevent one or more network components from being overloaded. For example, strengthening agent 102 may cause additional compute instances to be instantiated to support the additional load. In some embodiments, the strengthening agent 102 may utilize, create, and/or maintain the reliability data 104.

In some embodiments, reliability data 104 includes historical data (e.g., in a log) that strengthening agent 102 can analyze to identify correlations between an issue with a first component that can lead to impacts/issues with a second component. In some such embodiments, strengthening agent 102 may determine and/or set up for utilization one or more corrective actions to implement on the second component in response to the correlated issue with the first component. In many embodiments, the reliability data 104 can include a configuration table that identifies upstream and/or downstream dependencies. In many such embodiments, the strengthening agent 102 may register network components along with any associated configuration rules, preemptive actions and/or triggers in reliability data 104. In some embodiments, the reliability data 104 may enable strengthening agent 102 to gain an overview of the network components layout, even when different components are siloed. In various embodiments, the reliability data 104 may include up and downstream dependencies of one or more components of networked resources 106. In several embodiments, active capability, such as with respect to components in components sets 110-1, 110-2, 110-n or regions 108-1, 108-2, 108-n of the network comprising networked resources 106, may be noted along with pre-scripted code to initialize traffic rerouting and activation of appropriate regional endpoints. In one or more embodiments, strengthening agent 102 may provide user-initiated controls to simulate issues, such as errors or failures of network components. In one or more such embodiments, these controls may enable testing, such as for strengthening, in either production or simulated production environments (e.g., a copy system).

In various embodiments, strengthening agent 102 may hold (e.g., store as reliability data 104) a log of components optimal path. In many embodiments, scenarios of different issues may also be included. In one or more embodiments, when one of the scenarios occurs, strengthening agent 102 may initiate augmented changes to one or more impacted dependencies in an impact chain. In some embodiments, the strengthening agent 102 may identify and map interdependency chains for one or more portions of a network. In some such embodiments, the strengthening agent 102 may identify and/or correct one or more weaknesses in an interdependency chain. In one or more embodiments, the strengthening agent may generate one or more graphical representations of network configurations and dependencies. In one or more such embodiments, the graphical representations may be presented via a user interface. In various embodiments, the graphical representations may provide visualizations of network configurations and/or comparisons of an actualized network with its intended design.

In one or more embodiments, the networked resources 106 may comprise, or be comprised in, a computer network that includes physical resources and/or cloud resources. In various embodiments, physical resources may include physical hardware that are directly controlled, employed, and/or owned by an entity that provides the services and or applications implemented by the set of networked resources 106. In many embodiments, cloud resources may refer to a pool of hardware that is utilized to provide computational or data services to the entity without the entity having physical access or control over the hardware providing the computational or data services. For example, cloud resources may include computational or data services utilized (e.g., under a rental agreement) by the entity independent of the underlying hardware. In several embodiments, the networked resources 106 may be divided into one or more regions 108-1, 108-2, 108-n. In several such embodiments, each of the one or more regions 108-1, 108-2, 108-n may include a set of components that is utilized to provide computational or data services. In many embodiments, networked resources 106 and/or components sets 110-1, 110-2, 110-n may include and/or utilize one or more components illustrated in FIGS. 6 and 7.

In some embodiments, networked resources 106 may provide one or more platforms to implement components, such as one or more applications and/or services. In several embodiments, components of the networked resources 106 may comprise (e.g., be utilized to implement or host) one or more of an application programming interface (API), a database, an application, a service, enterprise systems, and one or more functionalities described herein. For example, components of networked resources 106 may include reliability data 104 and/or strengthening agent 102. In many embodiments, network components may include one or more resources, services, components, applications, systems, capabilities, and functionalities described herein.

Figure 2:
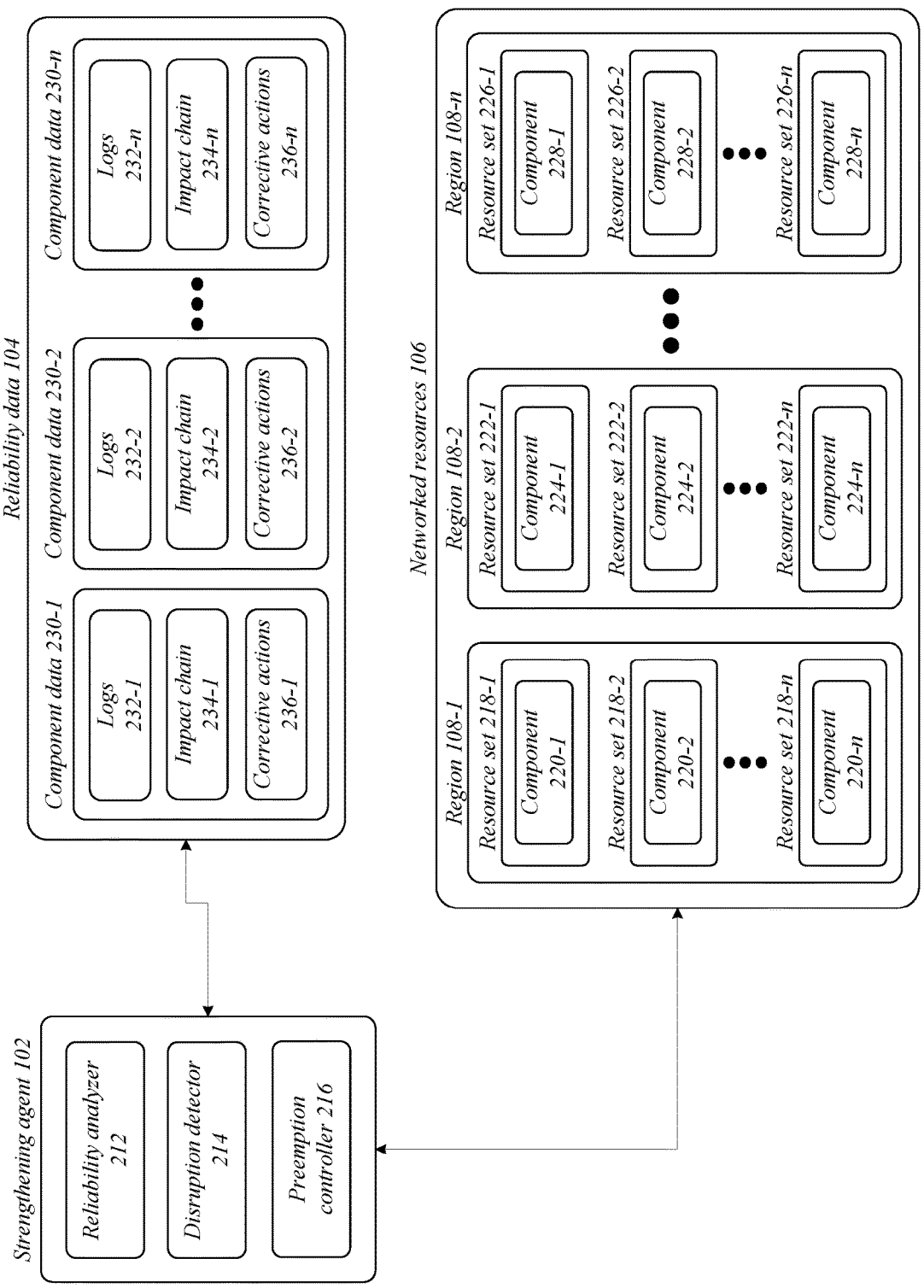
FIG. 2 illustrates exemplary aspects of networked resources according to one or more embodiments described herein.

FIG. 2 illustrates an embodiment of an operating environment 200 according to one or more embodiments described herein. Operating environment 200 may include the same or similar components as those illustrated in operating environment 100. In operating environment 200, strengthening agent 102 may include reliability analyzer 212, disruption detector 214, and preemption controller 216, reliability data 104 may include one or more component data 230-1, 230-2, 230-n, and networked resources 107 may include region 108-1 with one or more resource sets 218-1, 218-2, 218-n, region 108-2 with one or more resource sets 222-1, 222-2, 222-n, and region 108-n with one or more resources sets 226-1, 226-2, 226-n. Embodiments are not limited in this context.

In many embodiments, each of the resources sets in each region may include or be used to implement a component in a component set. For instance, resource set 218-1 of region 108-1 may implement component 220-1. In such instance, component 220-1 may be included in component set 110-1 of FIG. 1. Accordingly, in the illustrated embodiment, resource set 218-1, 218-2, 218-n of region 108-1 may implement component 220-1, 220-2, 220-n, respectively, resource set 222-1, 222-2, 222-n may implement component 224-1, 224-2, 224-n, respectively, and resource set 226-1, 226-2, 226-n may implement component 228-1, 228-2, 228-n, respectively. In various embodiments, a network component may include one or more of a region, a resource set, a component, and a component set.

In several embodiments, reliability data 104 may include component data for one or more of networked resources 106. In the illustrated embodiments, each of the component data 230-1, 230-2, 230-n may include a log 232-1, 232-2, 232-n, an impact chain 234-1, 234-2, 234-n, and one or more corrective actions 236-1, 236-2, 236-n. In various embodiments, the impact chain 234 for a respective component may include one or more indications (e.g., log entries) associated with upstream and/or downstream components affected by issues with the respective component. In many embodiments, analysis of the logs for a plurality of networked resources may enable the reliability analyzer 212 to identify correlations between components and issues. For example, reliability analyzer 212 may identify that whenever a first API fails, utilization of a second API exceeds a threshold shortly after. Accordingly, reliability analyzer 212 may determine a preemptive/corrective action (e.g., corrective actions 236-1) that increases the resources allocated to the second API automatically when the first API fails.

In many embodiments, reliability analyzer 212 may determine an impact chain based on logs for one or more of the components. In some embodiments, preemption controller 216 may be configured to implement one or more corrective actions in response to disruption detector 214 identifying an issue with a network component, such as by monitoring logs 232. In some embodiments, corrective actions 236 may include preemptive actions corresponding to one or more components along an impact chain 234.

In several embodiments, reliability data 104 may include a component registry associated with each component in networked resources 106. Further, each component registry may include one or more configurations for the associated component, one or more impact chains of the associated component, and one or more corrective actions for the one or more impact chains of the associated component. In many embodiments, the one or more configurations for an associated component may include one or more operational aspects/settings of the associated component. In many such embodiments, the one or more configurations for an associated component may be identified, or determined, by reliability analyzer 212 of strengthening agent 102.

In various embodiments, the one or more impact chains for an associated component may include one or more dependency chains (e.g., upstream and/or downstream dependencies) of the associated component. In various such embodiments, the one or more impact chains for the associated component may be identified, or determined, by reliability analyzer detector 212 of strengthening agent 102. In several embodiments, the one or more corrective actions may include one or more configurations for one or more components in the impact chains corresponding with the associated component. In several such embodiments, the one or more corrective actions may be identified, or determine, by reliability analyzer 212 of strengthening agent 102.

In some embodiments, the one or more corrective actions may include different actions for upstream and/or downstream components that correspond to different scenarios or network settings. In various embodiment, the one or more configurations may include a first configuration for when the component is located in region 108-1 and a second configuration for when the component is located in region 108-2. Similarly, the one or more impact chains may include different dependency chains (e.g., upstream and/or downstream dependencies) for an associated component that correspond to the different scenarios or network settings and the one or more corrective actions may include different configurations for components of the one or more impact chains that correspond to different scenarios or network settings. In various embodiments, reliability data 104 may include one or more sample or target configurations for one or more components.

In some embodiments, one or more of the corrective actions 236 may include configuration and/or traffic routing settings. In the illustrated embodiment, component data 230-1 may include logs 232-1, impact chains 234-1, and corrective actions 236-1, component data 230-2 may include logs 232-2, impact chains 234-2, and corrective actions 236-2, and component data 230-n may include logs 232-n, impact chains 234-n, and corrective actions 236-n. In some embodiments and/or examples described herein, component 220-1 may be associated with component data 230-1, component 220-2 may be associated with component data 230-2, and component 220-n may be associated with component data 230-n.

As previously mentioned, in the operating environment, strengthening agent 102 may include reliability analyzer 212, disruption detector 214, and preemption controller 216. In various embodiments, reliability analyzer 212 may identify the configuration and/or dependencies of one or more components in networked resources 106. In several such embodiments, reliability analyzer 212 may store the configuration of a component as a configuration in the corresponding component registry. In some such embodiments, reliability analyzer 212 may store the dependencies of a component as an impact chain in the corresponding component registry. In many such embodiments, reliability analyzer 212 may store configurations of components in an impact chain as a corrective action in the corresponding component registry.

In many embodiments, the disruption detector 214 may monitor one or more functional aspects of networked resources, such as components in networked resources 106 or traffic flow. In many such embodiments, the disruption detector 214 may monitor logs to monitor one or more functional aspects of the networked resources. In various embodiments, based on monitoring of the functional aspects may enable disruption detector 214 to identify issues with network components. For instance, disruption detector 214 may monitor an error log associated with component 220-2 (e.g., log 232-2) to identify an issue with the component 220-2.

In some embodiments, each of the logs 232 may include an event log and a response log that correspond to a component 220, 224, 228 in a set of components implemented by networked resources 106. In many embodiments, the event log may include one or more events associated with one or more operational issues identified for the associated component. In several embodiments, the response log may include one or more actions taken to remedy each of the one or more events in the event log. In various embodiments, a corresponding one or more actions in the response log taken to remedy a particular event of the one or more events in the event log may include actions taken on one or more associated components in the set of components implemented by the set of networked resources, with at least one upstream or downstream dependency to the component, that were affected by the particular event.

In some embodiments, when one or more of the monitored functional aspects crosses a threshold an issue with the associated component may be identified and/or one or more corrective actions 236-2 may be triggered. In some such embodiments, the corrective actions 236-2 may be triggered to prevent, or limit, the issue with the associated component from affecting the operation of one or more components along the impact chain 234-2. For example, if traffic flow to a network component spikes above a threshold, an issue with the network component may be identified. In another example, if utilization of resources implementing a component exceeds a threshold an issue with the component may be identified. In some embodiments, disruption detector 214 may compare configurations identified by reliability analyzer 212 with sample configurations in reliability data 104 to identify issues with an associated component.

In various embodiments, preemption controller 216 may implement and/or alter the configuration of one or more network components. For example, preemption controller 216 may implement corrective actions 236, such as one or more configurations in reliability data 104, based on issues identified by disruption detector 214 and/or reliability analyzer 212. In many embodiments, the corrective actions may include a configuration of a network component may include one or more operational aspects/settings of a network component and/or one or more operational aspects/setting associated therewith. For example, a configuration of a network component may include traffic flow to/from the network component. In another example, a configuration of a network component may include the set of resources allocated to implement the component (e.g., resources in the resource set 218-2 to implement component 220-2). In yet another example, a configuration of a network component may include one or more addresses used to communicate with other components. In still another example, a configuration of a network component may include an address or region of the network component. In yet another example, a configuration of a network component may include one or more upstream and/or downstream dependencies of the network component.

Figure 3:
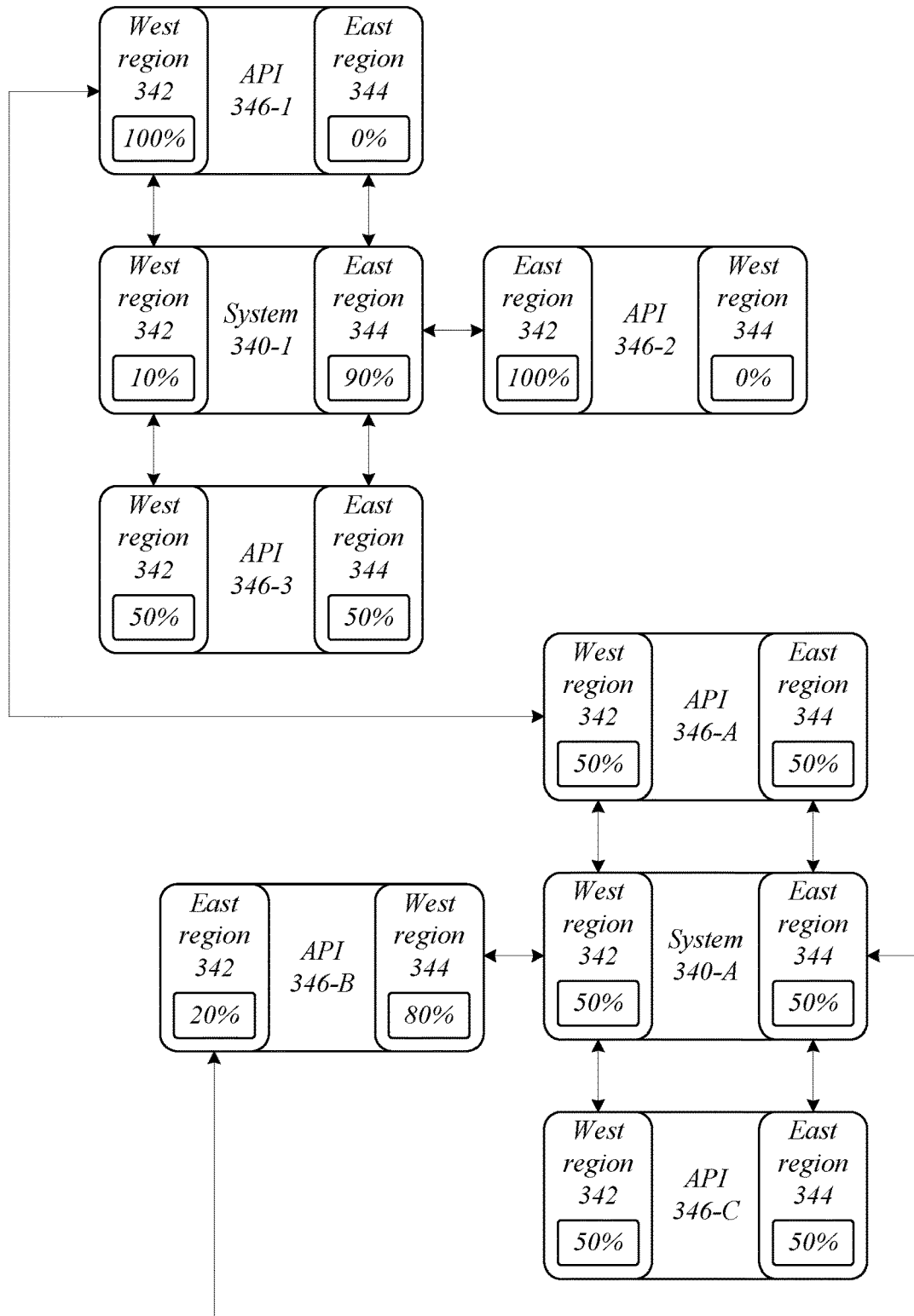
FIG. 3 illustrates exemplary aspects of a network configuration according to one or more embodiments described herein.

FIG. 3 illustrates exemplary aspects of a network configuration 301 in environment 300 according to one or more embodiments described herein. The network configuration 301 may include system 340-1, system 340-A, and APIs 346-1, 346-2, 346-3, 346-A, 346-B, 346-C. In some embodiments, APIs 346-1, 346-2, 346-3 may be up/downstream dependencies of system 340-1 and APIs 346-A, 346-B, 346-C may be up/downstream dependencies of system 340-A. Further, API 346-1 and API 346-A may have a dependency, resulting in systems 340-1, 340-A being interdependent. In the illustrated embodiment, API 346-1 and API 346-3 may include cloud APIs while API 346-2 may include a physical network API. Similarly, API 346-A and API 346-C may include cloud APIs while API 346-B may include a physical network API. In several embodiments, systems 340-1, 340-A and APIs 346-1, 346-2, 346-3, 346-A, 346-B, 346-C may each include one or more west region components and one or more east region components. In one or more embodiments described herein, traffic flow may be split between each of the regions. Embodiments are not limited in this context.

In the illustrated embodiment, traffic flow to system 340-1 may be split with 10% going to west region 342 and 90% going to east region 344, traffic to API 346-1 may be split with 100% going to west region 342 and 0% going to east region 344, traffic to API 346-2 may be split with 0% going to west region 342 and 100% going to east region 344, and traffic to API 346-3 may be split with 50% going to west region 342 and 50% going to east region 344.

Further, traffic flow to system 340-A may be split with 50% going to west region 342 and 90% going to east region 344, traffic to API 346-A may be split with 50% going to west region 342 and 50% going to east region 344, traffic to API 346-B may be split with 80% going to west region 342 and 20% going to east region 344, and traffic to API 346-C may be split with 50% going to west region 342 and 50% going to east region 344.

More generally, FIG. 3 shows the interdependencies among the network components in network configuration 301. In some embodiments, disruption detector 214 may detect an issue with the east region 344 of system 340-1, such as failure of the east region of system 340-1. In such embodiments, this may result in failover to a west region as well as one or more corrective actions for network components along the impact chain that are impacted by issues with the east region 344 of system 340-1, including one or more of APIs 346-1, 346-3, 346-A, 346-C, and system 340-A. In various embodiments, the corrective actions may include reconfiguration and/or traffic rerouting.

Understanding these issues and identifying correlations therebetween may enable one or more embodiments described herein to preemptively perform actions to strengthen the networked components 106. In many embodiments, the strengthening agent 102 may perform the corrective actions to the up/downstream components along the impact chain in parallel with responsive corrective actions being implemented on the component with issues. In various embodiments, the preemptive actions may improve network reliability and robustness.

In various embodiments, strengthening agent 102 may hold (e.g., store as reliability data 104) a log of a components optimal path. In many embodiments, scenarios of different issues may also be included. In one or more embodiments, when one of the scenarios occurs, strengthening agent 102 may initiate augmented changes to one or more impacted dependencies in an impact chain. For example, API 346-3 may be adjusted to 100% west traffic and autoscaling may be caused to create new instances to handle the higher traffic load to API 346-3 before it causes issues with API 346-3. In another example, API 346-4, which was already getting 100% of system 340-1 west region 342 traffic, needs new compute resources allocated. By performing one or more of these corrective actions in parallel, all systems and components can be hardened against disruptions/issues.

In many embodiments, these disruptions/issues may include one or more of the following issues: (1) a random-stop, a random-termination, a random-reboot, a reboot, or a stop that results in a node (e.g., network component) being unavailable; (2) random-CPU, all-CPU, or CPU that results in an unexpected CPU spike; (3) random-memory, all-memory, memory that results in an unexpected memory spike; (4) random-process, all-process that results in an inconsistent process; (5) network that results in latency or excessive bandwidth use; (6) random-stop that results in an unexpected task failure; (7) a reboot that results in an unexpected node reboot; (8) deny-access that results in an unavailability of a bucket; (9) reboot-with-failover that results in an unexpected data service failure; and (10) reboot-without-failover that results in an unexpected data service reboot. In several embodiments, any of the disruptions may cause the failure of the east region of system 540-1. In several such embodiments, one or more corrective actions may be performed on system 540-1 and one or more interdependent components in parallel.

Figure 4:
FIG. 4 illustrates an exemplary logic flow according to one or more embodiments described herein.

FIG. 4 illustrates one embodiment of a logic flow 400, which may be representative of operations that may be executed in various embodiments in conjunction with detecting issues with one or more network components and reconfiguring one or more upstream or downstream network components to preempt issues with the one or more upstream or downstream network components, such as by strengthening agent 102. The logic flow 400 may be representative of some or all of the operations that may be executed by or implemented on one or more components/devices described herein. The embodiments are not limited in this context.

In the illustrated embodiment shown in FIG. 4, the logic flow 400 may begin at block 402. At block 402 "analyze an event log and a response log that correspond to a component in a set of components implemented by a set of networked resources, the event log comprising one or more events associated with one or more operational issues identified for the component and the response log comprising one or more actions taken to remedy each of the one or more events in the event log, wherein a corresponding one or more actions in the response log taken to remedy a particular event of the one or more events in the event log include actions taken on one or more associated components in the set of components implemented by the set of networked resources, with at least one upstream or downstream dependency to the component, that were affected by the particular event" an event log and a response log that correspond to a component in a set of components implemented by a set of networked resources may be analyzed. In some embodiments, log 232-1 may include an event log and a response log that correspond to component 220-1. In such embodiments, the log 232-1 may be analyzed. In various embodiments, the event log and/or response log may be located on one or more networked resources 106.

Continuing the block 404 "determine a set of corrective actions to implement, in response to occurrence of the particular event to the component, on the one or more associated components, with at least one upstream or downstream dependency to the component, that were affected by the particular event based on analysis of the event log and the response log that correspond to the component in the set of components" a set of corrective actions to implement may be determined. For example, strengthening agent 102 may determine one or more of corrective actions 236-1 to implement on a component of networked resources 106 from impact chain 234-1 in response to a particular event.

At block 406 "identify an occurrence of the particular event of the one or more events comprised in the event log and associated with one or more operational issues identified for the component" an occurrence of the particular event may be identified for the component. For instance, disruption detector 214 may identify an occurrence of an event affecting component 220-1. Proceeding to block 408 "implement the set of corrective actions on one or more associated components, with at least one upstream or downstream dependency to the component, that were affected by the particular event in response to the occurrence of the particular event to prevent affects to the one or more associated components caused by the occurrence of the particular event" the set of corrective action may be implemented. For instance, preemption controller 216 may implement one or more of corrective actions 236-2 to component 228-2 based on occurrence of an event to component 224-1. In such instance, component 228-2 has an upstream/downstream dependence to/from component 224-1.

Figure 5:
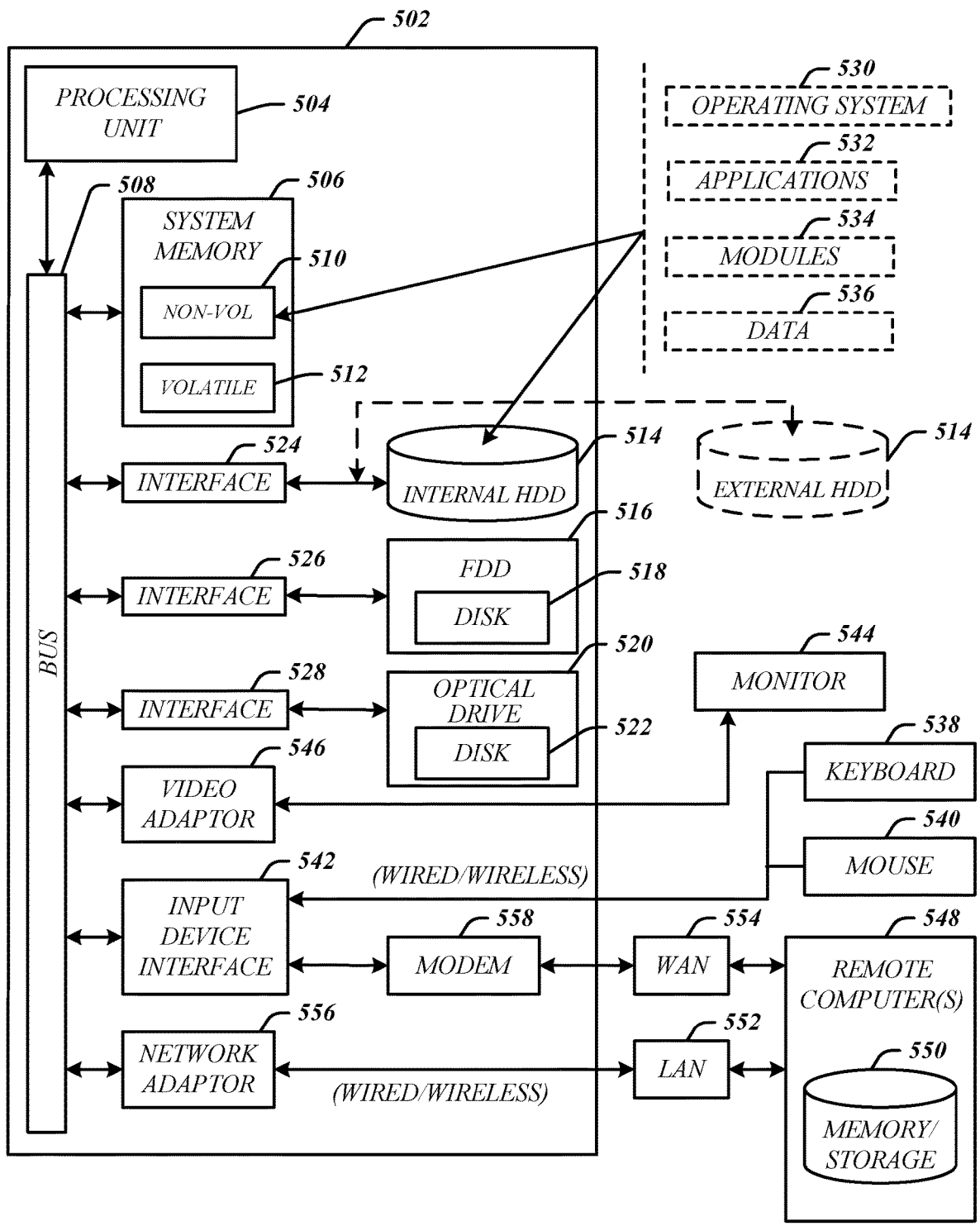
FIG. 5 illustrates exemplary aspects of a computing architecture according to one or more embodiments described herein.

FIG. 5 illustrates an embodiment of an exemplary computing architecture 500 that may be suitable for implementing various embodiments as previously described. In various embodiments, the computing architecture 500 may comprise or be implemented as part of an electronic device. In some embodiments, the computing architecture 500 may be representative, for example, of a computer system that implements one or more components described herein. In some embodiments, computing architecture 500 may be representative of one or more portions, such as hardware components, of one or more of networked resources 106 (e.g., hardware implementing one or more compute instances) that implement one or more embodiments, such as software components, described herein (e.g., strengthening agent 102). The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 500.

As shown in FIG. 5, the computing architecture 500 comprises a processing unit 504, a system memory 506 and a system bus 508. The processing unit 504 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 504.

The system bus 508 provides an interface for system components including, but not limited to, the system memory 506 to the processing unit 504. The system bus 508 can be any of several types of bus structure that may further interconnect to a memory bus (with or without a memory controller), a peripheral bus, and a local bus using any of a variety of commercially available bus architectures. Interface adapters may connect to the system bus 508 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 5, the system memory 506 can include non-volatile memory 510 and/or volatile memory 512. A basic input/output system (BIOS) can be stored in the non-volatile memory 510.

The computer 502 may include various types of computer-readable storage media in the form of one or more lower speed memory units, including an internal (or external) hard disk drive (HDD) 514, a magnetic floppy disk drive (FDD) 516 to read from or write to a removable magnetic disk 518, and an optical disk drive 520 to read from or write to a removable optical disk 522 (e.g., a CD-ROM or DVD). The HDD 514, FDD 516 and optical disk drive 520 can be connected to the system bus 508 by a HDD interface 524, an FDD interface 526 and an optical drive interface 528, respectively. The HDD interface 524 for external drive implementations can include at least one or both of Universal Serial Bus (USB) and IEEE 994 interface technologies.

The drives and associated computer-readable media provide volatile and/or nonvolatile storage of data, data structures, computer-executable instructions, and so forth. For example, a number of program modules can be stored in the drives and memory units 510, 512, including an operating system 530, one or more application programs 532, other program modules 534, and program data 536. In one embodiment, the one or more application programs 532, other program modules 534, and program data 536 can include, for example, the various applications and/or components described herein.

A user can enter commands and information into the computer 502 through one or more wire/wireless input devices, for example, a keyboard 538 and a pointing device, such as a mouse 540. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 504 through an input device interface 542 that is coupled to the system bus 508, but can be connected by other interfaces such as a parallel port, IEEE 994 serial port, a game port, a USB port, an IR interface, and so forth.

A monitor 544 or other type of display device is also connected to the system bus 508 via an interface, such as a video adaptor 546. The monitor 544 may be internal or external to the computer 502. In addition to the monitor 544, a computer typically includes other peripheral output devices, such as speakers, printers, and so forth.

The computer 502 may operate in a networked environment using logical connections via wire and/or wireless communications to one or more remote computers, such as a remote computer 548. In various embodiments, one or more interactions described herein may occur via the networked environment. The remote computer 548 can be a workstation, a server computer, a router, a personal computer, portable computer, microprocessor-based entertainment appliance, a peer device or other common network node, and typically includes many or all of the elements described relative to the computer 502, although, for purposes of brevity, only a memory/storage device 550 is illustrated. The logical connections depicted include wire/wireless connectivity to a local area network (LAN) 552 and/or larger networks, for example, a wide area network (WAN) 554. Such LAN and WAN networking environments are commonplace in offices and companies, and facilitate enterprise-wide computer networks, such as intranets, all of which may connect to a global communications network, for example, the Internet.

When used in a LAN networking environment, the computer 502 is connected to the LAN 552 through a wire and/or wireless communication network interface or adaptor 556. The adaptor 556 can facilitate wire and/or wireless communications to the LAN 552, which may also include a wireless access point disposed thereon for communicating with the wireless functionality of the adaptor 556.

When used in a WAN networking environment, the computer 502 can include a modem 558, or is connected to a communications server on the WAN 554, or has other means for establishing communications over the WAN 554, such as by way of the Internet. The modem 558, which can be internal or external and a wire and/or wireless device, connects to the system bus 508 via the input device interface 542. In a networked environment, program modules depicted relative to the computer 502, or portions thereof, can be stored in the remote memory/storage device 550. It will be appreciated that the network connections shown are exemplary and other means of establishing a communications link between the computers can be used.

The computer 502 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 6:
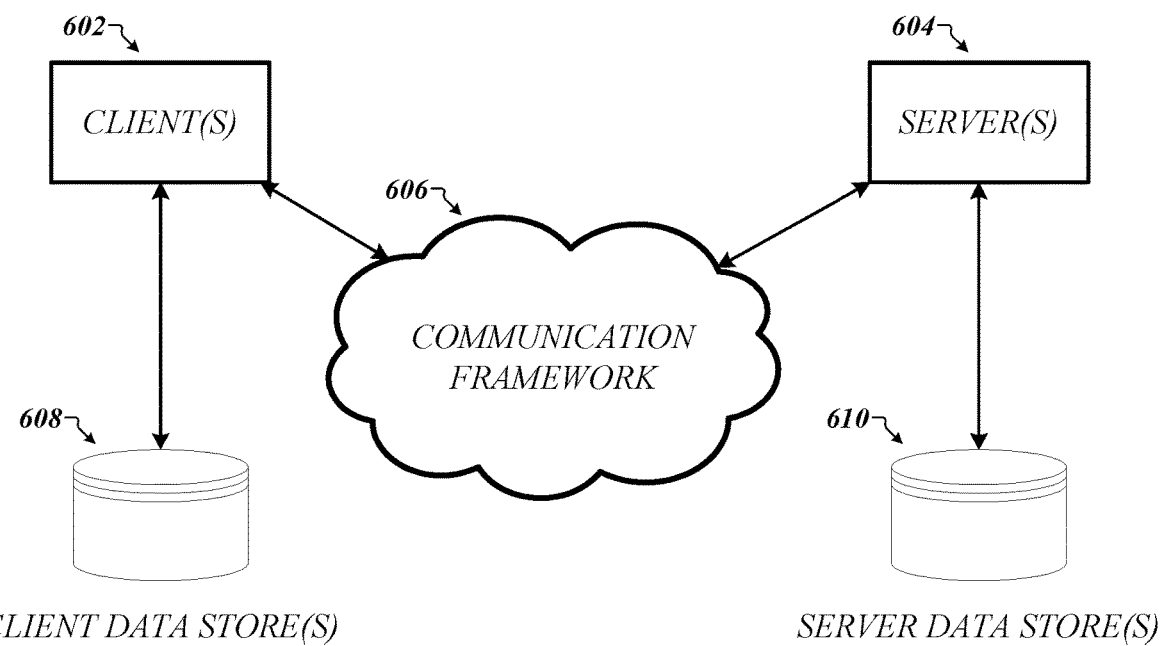
FIG. 6 illustrates exemplary aspects of a communications architecture according to one or more embodiments described herein.

FIG. 6 illustrates a block diagram of an exemplary communications architecture 600 suitable for implementing various embodiments as previously described, such as applications or services described herein. The communications architecture 600 includes various common communications elements, such as a transmitter, receiver, transceiver, radio, network interface, baseband processor, antenna, amplifiers, filters, power supplies, and so forth. The embodiments, however, are not limited to implementation by the communications architecture 600.

As shown in FIG. 6, the communications architecture 600 comprises includes one or more clients 602 and servers 604. The clients 602 and the servers 604 are operatively connected to one or more respective client data stores 608 and server data stores 610 that can be employed to store information local to the respective clients 602 and servers 604, such as cookies and/or associated contextual information. In various embodiments, any one of servers 604 may implement one or more of logic flows or operations described herein, and storage mediums described herein, such as in conjunction with storage of data received from any one of clients 602 on any of server data stores 610.

The clients 602 and the servers 604 may communicate information between each other using a communication framework 606. The communications framework 606 may implement any well-known communications techniques and protocols. The communications framework 606 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 606 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 602 and the servers 604. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or rewriteable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

The invention claimed is:

1. An apparatus, comprising:
a processor; and
a memory comprising instructions that when executed by the processor cause the processor to:
identify a correlation between occurrence of a first event that affects operation of a first component and occurrence of a second event that affects operation of a second component, wherein the second component has at least one upstream or downstream dependency to the first component;
determine a set of preemptive actions to implement on the second component in response to occurrence of the first event to the first component based on identification of the correlation between occurrence of the first event that affects operation of the first component and occurrence of the second event that affects operation of the second component;
identify an occurrence of the first event; and
implement the set of preemptive actions on the second component in response to identification of the occurrence of the first event.

2. The apparatus of claim 1, the memory comprising instructions that when executed by the processor cause the processor to analyze an event log and a response log that corresponds to the first component to identify the correlation between occurrence of the first and second events.

3. The apparatus of claim 2, wherein the event log comprises historical data of one or more events associated with one or more operational issues identified for the first component and the response log comprises historical data of one or more actions taken to remedy each of the one or more events in the event log.

4. The apparatus of claim 3, wherein a corresponding one or more actions in the response log taken to remedy the first event of the one or more events in the event log include actions taken on the second component.

5. The apparatus of claim 3, the memory comprising instructions that when executed by the processor cause the processor to determine the set of preemptive actions to implement on the second component in response to occurrence of the first event to the first component based on analysis of the historical data in the event log and the historical data in the response log that corresponds to the first component.

6. The apparatus of claim 1, wherein the set of preemptive actions comprise reconfiguring traffic routing from the first component to the second component.

7. The apparatus of claim 1, wherein the set of preemptive actions comprise allocation of additional compute resources for implementation of the second component.

8. At least one non-transitory computer-readable medium comprising a set of instructions that, in response to being executed by a processor circuit, cause the processor circuit to:
identify a correlation between occurrence of a first event that affects operation of a first component and occurrence of a second event that affects operation of a second component, wherein the second component has at least one upstream or downstream dependency to the first component;
determine a set of preemptive actions to implement on the second component in response to occurrence of the first event to the first component based on identification of the correlation between occurrence of the first event that affects operation of the first component and occurrence of the second event that affects operation of the second component;
identify an occurrence of the first event; and
implement the set of preemptive actions on the second component in response to identification of the occurrence of the first event.

9. The at least one non-transitory computer-readable medium of claim 8, comprising instructions that, in response to being executed by a processor circuit, cause the processor circuit to analyze an event log and a response log that corresponds to the first component to identify the correlation between occurrence of the first and second events.

10. The at least one non-transitory computer-readable medium of claim 9, wherein the event log comprises historical data of one or more events associated with one or more operational issues identified for the first component and the response log comprises historical data of one or more actions taken to remedy each of the one or more events in the event log.

11. The at least one non-transitory computer-readable medium of claim 10, wherein a corresponding one or more actions in the response log taken to remedy the first event of the one or more events in the event log include actions taken on the second component.

12. The at least one non-transitory computer-readable medium of claim 10, comprising instructions that, in response to being executed by a processor circuit, cause the processor circuit to determine the set of preemptive actions to implement on the second component in response to occurrence of the first event to the first component based on analysis of the historical data in the event log and the historical data in the response log that corresponds to the first component.

13. The at least one non-transitory computer-readable medium of claim 8, wherein the set of preemptive actions comprise reconfiguring traffic routing from the first component to the second component.

14. The at least one non-transitory computer-readable medium of claim 8, wherein the set of preemptive actions comprise allocation of additional compute resources for implementation of the second component.

15. A computer-implemented method, comprising:
identifying a correlation between occurrence of a first event that affects operation of a first component and occurrence of a second event that affects operation of a second component, wherein the second component has at least one upstream or downstream dependency to the first component;
determining a set of preemptive actions to implement on the second component in response to occurrence of the first event to the first component based on identification of the correlation between occurrence of the first event that affects operation of the first component and occurrence of the second event that affects operation of the second component;
identifying an occurrence of the first event; and
implementing the set of preemptive actions on the second component in response to identification of the occurrence of the first event.

16. The computer-implemented method of claim 15, comprising analyzing an event log and a response log that corresponds to the first component to identify the correlation between occurrence of the first and second events.

17. The computer-implemented method of claim 16, the event log comprises historical data of one or more events associated with one or more operational issues identified for the first component and the response log comprises historical data of one or more actions taken to remedy each of the one or more events in the event log.

18. The computer-implemented method of claim 17, wherein a corresponding one or more actions in the response log taken to remedy the first event of the one or more events in the event log include actions taken on the second component.

19. The computer-implemented method of claim 17, comprising determining the set of preemptive actions to implement on the second component in response to occurrence of the first event to the first component based on analysis of the historical data in the event log and the historical data in the response log that corresponds to the first component.

20. The computer-implemented method of claim 15, wherein the set of preemptive actions comprise reconfiguring traffic routing from the first component to the second component or allocating additional compute resources for implementation of the second component.

* * * * *